US008380484B2

(12) United States Patent
Davis et al.

(10) Patent No.: US 8,380,484 B2
(45) Date of Patent: Feb. 19, 2013

(54) METHOD AND SYSTEM OF DYNAMICALLY CHANGING A SENTENCE STRUCTURE OF A MESSAGE

(75) Inventors: Brent L. Davis, Deerfield Beach, FL (US); Stephen W. Hanley, Boynton Beach, FL (US); Vanessa V. Michelini, Boca Raton, FL (US); Melanie D. Polkosky, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1411 days.

(21) Appl. No.: 10/915,025

(22) Filed: Aug. 10, 2004

(65) Prior Publication Data

US 2006/0036433 A1 Feb. 16, 2006

(51) Int. Cl.
*G06F 17/20* (2006.01)

(52) U.S. Cl. ............. 704/1; 704/275; 704/9; 704/270.1; 704/270; 704/268; 704/260; 704/258; 704/257; 704/244; 704/211; 704/209; 704/2; 709/246; 701/36; 463/43; 379/88.22; 379/202.01

(58) Field of Classification Search .............. 704/9, 260, 704/275, 258, 270.1, 270, 268, 257, 244, 704/211, 209, 2; 379/202.01, 88.22; 3/9, 3/260; 709/246; 701/36; 463/43
See application file for complete search history.

(56) References Cited

U.S. PATENT DOCUMENTS 5,027,406 A * 6/1991 Roberts et al. ................ 704/244
5,774,860 A 6/1998 Bayya et al.
5,802,488 A 9/1998 Edatsune
6,151,571 A * 11/2000 Pertrushin ..................... 704/209
6,173,266 B1 1/2001 Marx et al.
6,178,404 B1 * 1/2001 Hambleton et al. .......... 704/275
6,233,545 B1 * 5/2001 Datig ................................ 704/2
6,246,981 B1 6/2001 Papineni et al.
6,324,513 B1 11/2001 Nagai et al.
6,334,103 B1 12/2001 Surace et al.
6,418,440 B1 7/2002 Kuo et al.
6,496,836 B1 * 12/2002 Ronchi et al. ......................... 1/1
6,507,818 B1 1/2003 Fishman et al.
6,513,008 B2 1/2003 Pearson et al.
6,526,128 B1 * 2/2003 Kermani .................... 379/88.22
6,598,020 B1 7/2003 Kleindienst et al.
6,598,022 B2 7/2003 Yuschik
6,606,596 B1 8/2003 Zirngibl et al.
6,647,363 B2 11/2003 Claassen
6,658,388 B1 12/2003 Kleindienst et al.
6,676,523 B1 * 1/2004 Kasai et al. ..................... 463/43
6,970,946 B2 * 11/2005 Ueoka et al. .................. 709/246
7,085,635 B2 * 8/2006 Boman et al. ................... 701/36
(Continued)

FOREIGN PATENT DOCUMENTS

EP 0697780 2/1996

*Primary Examiner* — Michael Colucci
(74) *Attorney, Agent, or Firm* — Novak Druce Connolly Bove + Quigg LLP

(57) ABSTRACT

A method (50) of dynamically changing a sentence structure of a message can include the step of receiving (51) a user request for information, retrieving (52) data based on the information requested, and altering (53) among an intonation and/or the language conveying the information based on the context of the information to be presented. The intonation can optionally be altered by altering (54) a volume, a speed, and/or a pitch based on the information to be presented. The language can be altered by selecting (55) among a finite set of synonyms based on the information to be presented to the user or by selecting (56) among key verbs, adjectives or adverbs that vary along a continuum.

6 Claims, 2 Drawing Sheets

U.S. PATENT DOCUMENTS

| | | | | |
|---|---|---|---|---|
| 7,139,714 | B2 * | 11/2006 | Bennett et al. | 704/270.1 |
| 7,260,519 | B2 * | 8/2007 | Polanyi et al. | 704/9 |
| 7,302,383 | B2 * | 11/2007 | Valles | 704/9 |
| 7,313,523 | B1 * | 12/2007 | Bellegarda et al. | 704/268 |
| 7,536,300 | B2 * | 5/2009 | Hejna, Jr. | 704/211 |
| 7,653,543 | B1 * | 1/2010 | Blair et al. | 704/270 |
| 7,693,720 | B2 * | 4/2010 | Kennewick et al. | 704/275 |
| 2002/0072908 | A1 * | 6/2002 | Case et al. | 704/260 |
| 2002/0128838 | A1 * | 9/2002 | Veprek | 704/258 |
| 2002/0156632 | A1 * | 10/2002 | Haynes et al. | 704/270 |
| 2002/0173960 | A1 * | 11/2002 | Ross et al. | 704/257 |
| 2003/0061049 | A1 * | 3/2003 | Erten | 704/260 |
| 2003/0112947 | A1 * | 6/2003 | Cohen | 379/202.01 |
| 2004/0133418 | A1 * | 7/2004 | Turcato et al. | 704/9 |
| 2004/0193420 | A1 * | 9/2004 | Kennewick et al. | 704/257 |

* cited by examiner

METHOD AND SYSTEM OF DYNAMICALLY CHANGING A SENTENCE STRUCTURE OF A MESSAGE

BACKGROUND OF THE INVENTION

1. Technical Field

This invention relates to the field of speech creation or synthesis, and more particularly to a method and system for dynamic speech creation for messages of varying lexical intensity.

2. Description of the Related Art

Interactive voice response (IVR)-based speech portals or systems that provide informational messages to callers based on user selection/navigational commands tend to be monotonous and characteristically machine-like. The monotonous machine-like voice is due to the standard interface design approach of providing "canned" text messages synthesized by a text to speech (TTS) engine or prerecorded audio segments that constitute the normalized appropriate response to the callers' inquiries. This is very dissimilar to "human-to-human" based dialog, where, based on the magnitude of the difference from the norm of the situation being discussed, the response is altered by changing the parts of speech (verbs and adverbs) to create the necessary effect that the individual wants to represent. No existing IVR system dynamically alters a message to be presented based on the context or situation being discussed in order to more closely replicate "human-to-human" based dialog.

U.S. Pat. No. 6,334,103 by Kevin Surace et al. discusses a system that changes behavior (using different "personalities") based on user responses, user experience and context provided by the user. Prompts are selected randomly or based on user responses and context as opposed to changes based on the context of the information to be presented. In U.S. Pat. No. 6,658,388 by Jan Kleindienst et al., the user can select (or create) a personality through configuration. Each personality has multiple attributes such as happiness, frustration, gender, etc. Again, the particular attributes are selectable by the user. In this regard, each person who calls the system as described in U.S. Pat. No. 6,658,388 will experience a different behavior based on the personality attributes the user has configured in his/her preferences. Again, the language or sentence structure will not change dynamically based on the context of the information to be presented. Rather, a given person will always interact with the same personality, unless the configuration is changed by him/her. Although the prompts are tailored to suit user preferences, a user of a conventional system would still fail to hear a unique dynamic message that most accurately describes a particular event.

SUMMARY OF THE INVENTION

Embodiments in accordance with the invention can enable a method and system for changing a sentence structure of a message in an IVR system or other type of voice response system in accordance with the present invention.

In a first aspect of the invention, a method of dynamically changing a sentence structure of a message can include the steps of receiving a user request for information, retrieving data based on the information requested, and altering among an intonation and/or the language conveying the information based on the context of the information to be presented. The intonation can be altered by altering among a volume, a speed, and/or a pitch based on the information to be presented. The language can be altered by selecting among a finite set of synonyms based on the information to be presented to the user or by selecting among key verbs, adjectives or adverbs that vary along a continuum from a standard outcome to a highly unlikely outcome or to a extreme outcome.

In a second aspect of the invention, an interactive voice response system can include a database containing a plurality of substantially synonymous words and syntactic rules to be used in a user output dialog and a processor that accesses the database. The processor can be programmed to receive a user request for information, retrieve data based on the information requested, and alter an intonation and/or the language conveying the information based on the context of the information to be presented. The processor can be further programmed to alter the intonation by altering a volume, a speed, and/or a pitch based on the information to be presented. The processor can be further programmed to alter the language by selecting among the plurality of substantially synonymous words based on the information to be presented to the user or alternatively by selecting among key verbs, adjectives or adverbs that vary along a continuum from a standard outcome to a highly unlikely outcome or to a extreme outcome.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
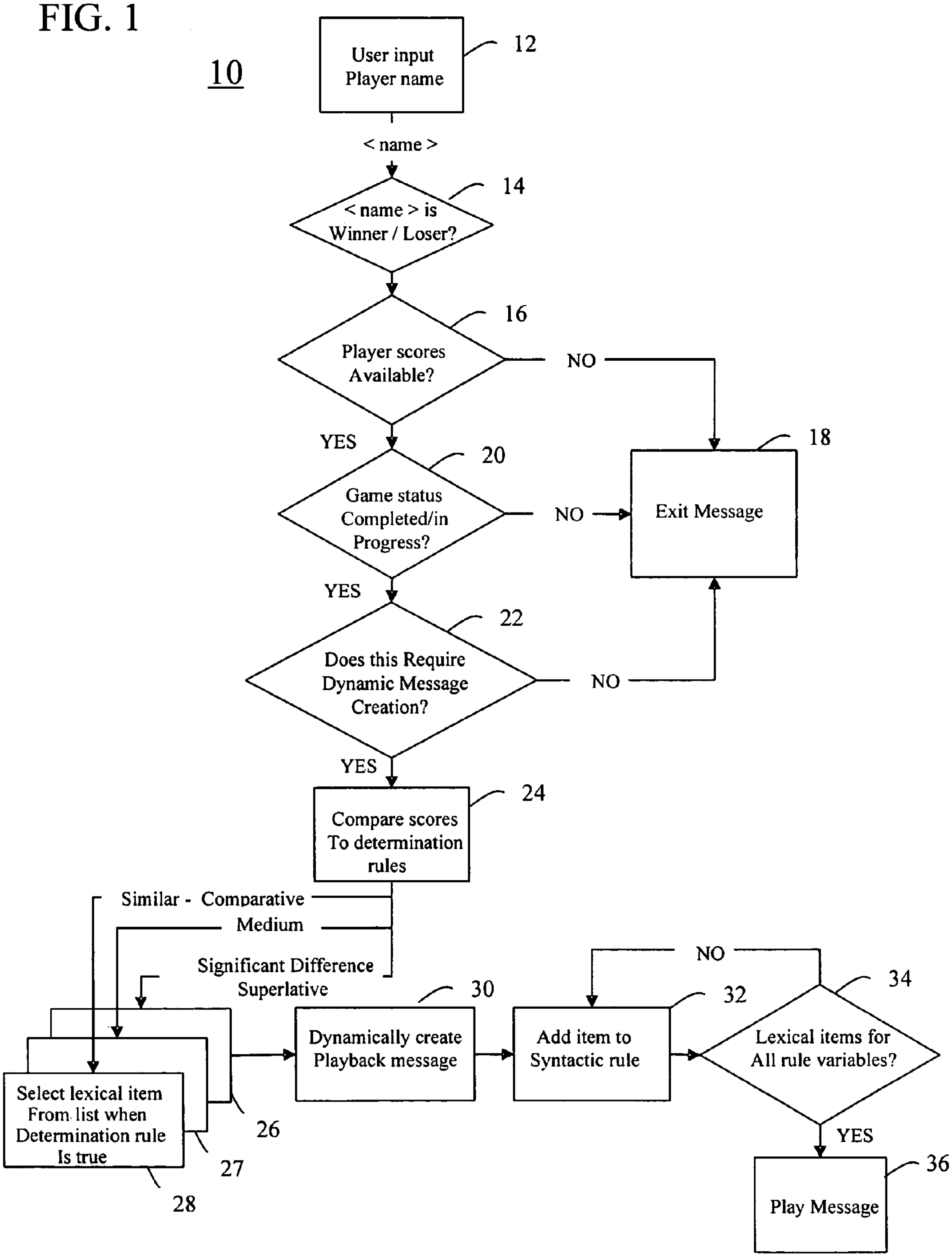
FIG. 1 is a flow chart illustrating a method of dynamically changing a sentence structure of a message in accordance with an embodiment of the present invention.

Embodiments in accordance with the invention can provide an IVR system closer approximating a human-to-human dialog. Accordingly, a method, a system, and an apparatus can efficiently modify automated machine playback of messages in a manor that approximates actual human dialog by weighting the key variables associated with the application domain (e.g., Sports Scores, Entertainment Ratings, Financial Results, etc.). The present invention can also dynamically select the parts of speech used by automated speech generation to vary the meaning of the resulting sentence. As in human speech, the message construction according to one embodiment can consist partly of speech variables, which are then filled with tokens that convey a desired meaning to create an "illusion" that the system actually "reacts" to the information being disseminated. An example of this interaction in a sports score portal would be: "the Dolphins trounced the Lions 41 to 3 yesterday in a home field advantage". In this example, based on the score difference, the verb "trounced" was selected and the audio volume was optionally attenuated under programmable control.

In one embodiment and within a user output dialog, the key verbs, adjectives, and adverbs can be selected that vary the message along a continuum from a standard or typical outcome to a highly unlikely outcome or an extreme outcome. A set table or database can be created with synonyms and attenuation levels for each or some of these words. Based on content to be conveyed, a syntactic rule and part of speech variables can be assigned to convey the content. Then tokens are selected that represent a range of meaning intensities in the particular context.

A first example below illustrates an IVR Application for a Tennis Tours Information Center that provides up-to-date information of games, players, ranking, and other pertinent information.

(S for system and C for customer or caller).

Scenario 1:

S: Welcome to <tournament name> information center. How may I help you?

C: I would like information about the games in progress.

S: There are 2 games in progress at this moment. Select Andre Agassi×Bjorn Borg or Guga×Juan.

Carlos Ferrero

C: The one with Guga.

S: Guga is leading Juan Carlos Ferrero. Set 1: six three. Set 2, in progress, five one.

In Scenario 1 above, the syntactic rule (meaning, the method by which lexical items will be combined to form the message) is:

Message=<requestedplayername>+<presentprogressive-verb>>+<opponentname>. <completed set score> <in progress set score>.

The part of speech variables for verbs is shown in the table below.

columns Name Selected is a Winner and Name Selected is a Loser are then used to select the words based on their intensity/weight. In Scenario 1, the user requested information about a game in progress referring to the player who is winning, then the system chose the word "is leading" to create the response. In Scenario 2, the user requested information about a game that is over and referring to the winning player. The system applied the rules defined by the table to create the response using the word "beat". In both scenarios, the verb was selected using predetermined rules (shown in the last column of the table) to convey an intended meaning about the likelihood of the game's outcome.

Referring to FIG. 1, a flow chart of a method 10 of dynamically changing a sentence structure of a message to be presented is shown. In this particular instance, the method 10 utilizes a tennis tournament example, but the methods demonstrated herein can be applied to any system desiring a dynamic dialog responsive to the context of the message to be presented. At step 12, a user can request information on a particular player and the system can determine if the player is a winner or loser at step 14. If no player scores are available at step 16, then an exit message is provided at step 18. If player scores are available at step 16, then an inquiry is made regarding the game status at decision block 20. If no game status information is available, then the exit information is provided at step 18. If the game status is completed or in progress at decision block 20, then a further decision is made

| Game Status | Name Selected is a Winner | Name Selected is a Loser | Determination |
|---|---|---|---|
| Game Over - Upset | | | A top 5 seed loses to a non top 5 seed player and it was during the final two rounds |
| | Upset | Was upset by | |
| | Surprised | Was surprised by | |
| Games Over - Lop Sided | | — | Opponent did not win and margin of victory in a two set game and >10 game. |
| | Demolished | Was demolished by | |
| | Trounced | Was trounced by | |
| | Whipped | Was whipped by | |
| | Crushed | Was crushed by | |
| | Routed | Was routed by | |
| | Flattened | Was flattened by | |
| | Knocked Out | Was knocked out by | |
| Games Over - Close Games | | | Not one of the above covers and... |
| | Won over | Lost against | |
| | Beat | Was beaten by | |
| | Eeked By | | |
| | Fended off | | Top 5 seed was the winner against a non-top 5 seed |
| | Defeated | Was defeated by | |
| | Won in straight sets over | Lost in straight sets to | Opponent did not win a |
| Games In Progress | | | |
| | Is Leading | Is loosing to | Identify the leader of current set and add to the # of sets played Compare to opponent. |
| | Is Playing | | If tie, use this. |

Scenario 2:

S: Welcome to <tournament name> information center. How may I help you?

C: What's the result of Agassi's game?

S: Today, 4th seed Andre Agassi beat Bjorn Borg. Results were six four, six four, six one.

In Scenario 2, the syntactic rule is:

Message=<adverb> <ranking> <requestedplayername><pasttenseverb> <opponent> <score>

The table above was used by both sample applications to dynamically create the system response based on user a request. The columns Game Status and Determination are used to decide the group of words or terminology to use. The whether the score and game status justifies a dynamic message creation at decision block 22. If no dynamic message creation is required at decision block 22, then the exit message is provided once again at step 18. If a dynamic message is required, then the scores are compared to determine the rules at step 24. A lexical item can be selected from a list when a determination rule is found true for a similar score between players at step 28, or a medium difference at step 27, or a significant difference in scores at step 26. Once the appropriate lexical item is selected according to the determination rules, a playback message is dynamically created at step 30. The lexical item is added to the syntactic rule at step 32. Decision block 34 determines if any additional lexical items need to be added. If all the lexical items are found for the variables denoted at decision block 34, then the message can be played at step 36.

Figure 2:
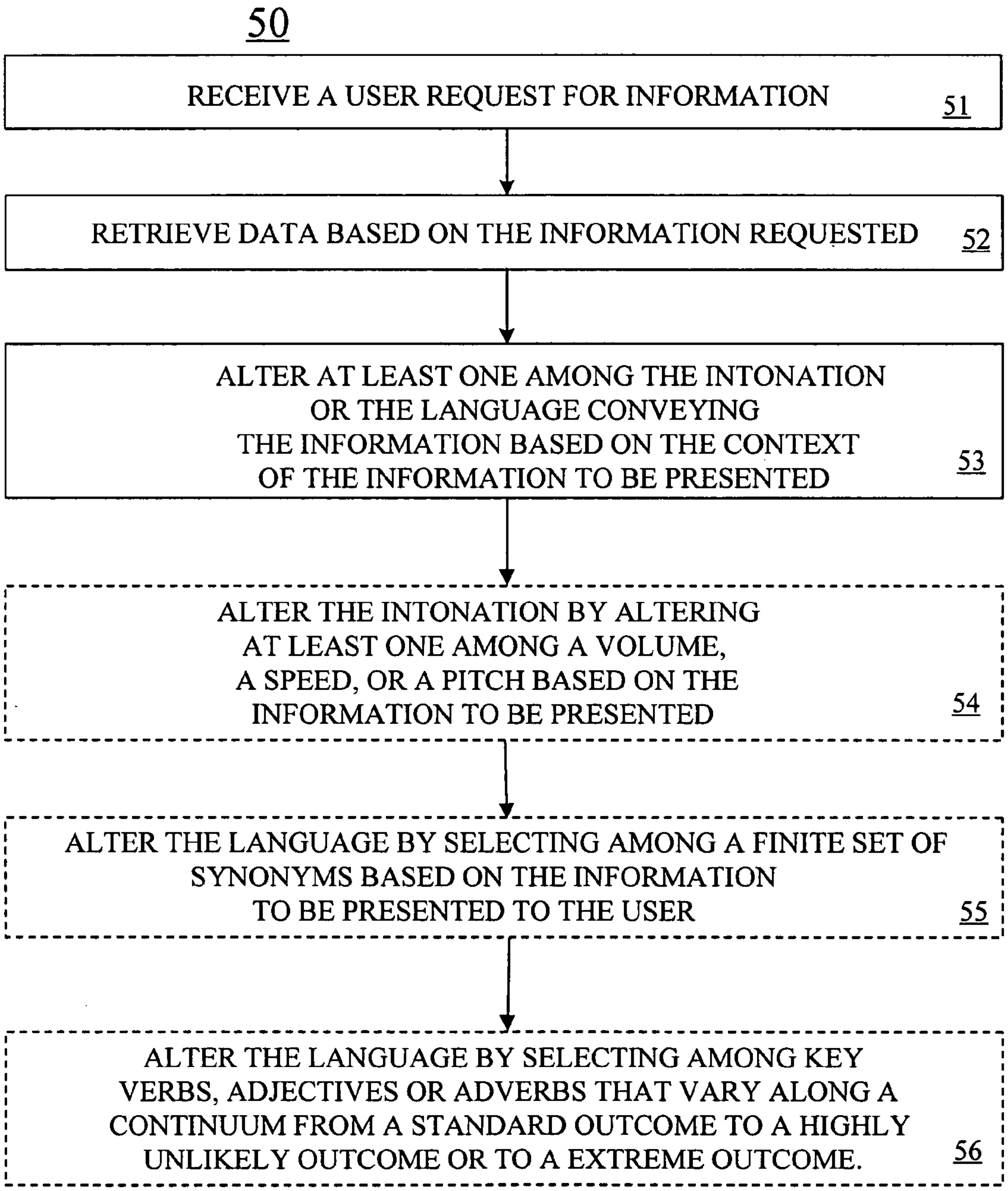
FIG. 2 is another flow chart illustrating another method of dynamically changing a sentence structure of a message in accordance with an embodiment of the present invention.

Referring to FIG. 2, a method 50 illustrates another example of dynamically changing a sentence structure. The method 50 can include the step 51 of receiving a user request for information, retrieving data based on the information requested at step 52, and altering at step 53 the intonation and/or the language conveying the information based on the context of the information to be presented. The intonation can optionally be altered by altering a volume, a speed, and/or a pitch based on the information to be presented as shown in block 54. The language can be altered by selecting among a finite set of synonyms based on the information to be presented to the user as shown in block 55 or by selecting among key verbs, adjectives or adverbs. These can vary along a continuum as shown in block 56.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of dynamically modifying automated machine playback of messages in an interactive voice response system in a manner that approximates actual human dialog by varying key variables associated with an application domain, comprising the steps of:

creating a table or database with synonyms of the key variables and predetermined rules for selecting a synonym for a key variable based on a context of a message to be generated;

receiving a user request for information;

retrieving data based on the information requested;

generating a message responsive to the user request for conveying the information to the user, the message being generated using syntactic rules;

dynamically modifying the message by altering intonation and selecting an appropriate synonym for each key variable of the message from the table or database, wherein the altering and the selecting are both based on a context of the information to be presented, wherein the context is related to the application domain and defines situations where different key variables can be selected based on certain determination criteria; and playing back the modified message to the user;

wherein the intonation includes at least one of a volume, a speed, and a pitch, wherein the key variables include at least one of key verbs and adverbs, and wherein the key variables are selected among a finite set of synonyms in the table or database based on the context of the information to be presented to the user.

2. The method of claim 1, wherein the finite set of synonyms vary along a continuum from a standard outcome to a highly unlikely outcome or to an extreme outcome of an event.

3. A computer-implemented interactive voice response system for dynamically modifying automated machine playback of messages in a manner that approximates actual human dialog by varying key variables associated with an application domain, comprising:

a database containing a plurality of synonyms for the key variables associated with the application domain and predetermined rules for selecting a synonym for a key variable based on a context of a message to be generated; and a processor that accesses the database, wherein the processor is programmed to:

receive a user request for information;

retrieve data based on the information requested;

generate a message responsive the user request for conveying the information to the user;

dynamically modify the message by altering intonation and selecting an appropriate synonym for each key variable of the message from the database, wherein the altering and the selecting are both based on a context of the information to be presented, wherein the context is related to the application domain and defines situations where different key variables can be selected based on certain determination criteria; and play back the modified message to the user;

wherein the intonation includes at least one of a volume, a speed, and a pitch, wherein the key variables include at least one of key verbs and adverbs, and wherein the key variables are selected among a finite set of synonyms in the database based on the context of the information to be presented to the user.

4. The system of claim 3, wherein the finite set of synonyms vary along a continuum from a standard outcome to a highly unlikely outcome or to an extreme outcome of an event.

5. A non-transitory computer-readable storage, having stored thereon a computer program having a plurality of code sections executable by a machine for causing the machine to perform a method of dynamically modifying automated machine playback of messages in an interactive voice response system in a manner that approximates actual human dialog by varying key variables associated with an application domain comprising the steps of:

creating a table or database with synonyms of the key variables and predetermined rules for selecting a synonym for a key variable based on a context of a message to be generated;

receiving a user request for information;

retrieving data based on the information requested;

generating a message responsive the user request for conveying the information to the user, the message being generated using syntactic rules;

dynamically modify the message by altering intonation and selecting an appropriate synonym for each key variable of the message from the database, wherein the altering and the selecting are both based on a context of the information to be presented, wherein the context is related to the application domain and defines situations where different key variables can be selected based on certain determination criteria; and playing back the modified message to the user;

wherein the intonation includes at least one of a volume, a speed, and a pitch, wherein the key variables include at least one of key verbs and adverbs, and wherein the key variables are selected among a finite set of synonyms in the table or database based on the context of the information to be presented to the user.

6. The non-transitory computer-readable storage of claim 5, wherein the finite set of synonyms vary along a continuum from a standard outcome to a highly unlikely outcome or to an extreme outcome of an event.

* * * * *